United States Patent
Särkimäki et al.

(10) Patent No.: US 12,314,027 B2
(45) Date of Patent: May 27, 2025

(54) COLLECTING DATA ON AN INDUSTRIAL AUTOMATION DEVICE

(71) Applicant: ABB Schweiz AG, Baden (CH)

(72) Inventors: Ville Särkimäki, Helsinki (FI); Zhongliang Hu, Helsinki (FI)

(73) Assignee: ABB Schweiz AG, Baden (CH)

( * ) Notice: Subject to any disclaimer, the term of this patent is extended or adjusted under 35 U.S.C. 154(b) by 422 days.

(21) Appl. No.: 17/806,195

(22) Filed: Jun. 9, 2022

(65) Prior Publication Data

US 2022/0397883 A1 Dec. 15, 2022

(30) Foreign Application Priority Data

Jun. 15, 2021 (EP) ..................... 21179551

(51) Int. Cl.
*G05B 19/406* (2006.01)
*G05B 19/042* (2006.01)
*G06F 11/3668* (2025.01)

(52) U.S. Cl.
CPC ....... *G05B 19/406* (2013.01); *G05B 19/0426* (2013.01); *G06F 11/3684* (2013.01); *G05B 2219/31316* (2013.01)

(58) Field of Classification Search
CPC .............. G05B 19/406; G05B 19/0426; G05B 2219/31316; G06F 11/3684
See application file for complete search history.

(56) References Cited

U.S. PATENT DOCUMENTS

2015/0287318 A1* 10/2015 Nair ................. G06Q 10/10
340/5.6

FOREIGN PATENT DOCUMENTS

| EP | 3220220 A1 | | 9/2017 |
|----|------------|---|--------|
| JP | 2002-149207 A | * | 5/2002 |
| WO | 2018203926 A1 | | 11/2018 |

OTHER PUBLICATIONS

European Search Report; Application No. EP 21 17 9551; Issued: Nov. 2, 2021; 2 Pages.

* cited by examiner

*Primary Examiner* — Michael W Choi
(74) *Attorney, Agent, or Firm* — Whitmyer IP Group LLC

(57) ABSTRACT

To provide adaptiveness to data collected on an industrial automation device, a test is used for a specific need. A set of parameter values to be used during the test are temporary and send to the industrial automation device with an indication of a test. Before the test is run, existing parameter values are backed up, and they are restored after the test.

19 Claims, 4 Drawing Sheets

COLLECTING DATA ON AN INDUSTRIAL AUTOMATION DEVICE

FIELD

The present invention relates to collecting data on an industrial automation device.

BACKGROUND ART

The evolvement of networking between computers and measurement devices, especially different sensors, capable of communicating without user involvement, has increased the amount of data collected on industrial automation devices or processes controlled by industrial automation devices, for example for different secure cloud services, such as remote monitoring or optimizing settings. However, different services may require different collected data.

SUMMARY

According to an aspect, there is provided the subject matter of the independent claims. Embodiments are defined in the dependent claims.

Some embodiments provide adaptiveness to the collected data by using a concept called a test in which an industrial automation device is set to use during a test run another, temporary, set of parameter settings.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system that comprises one or more industrial sites comprising one or more industrial automation devices, equipment configured to provide remote services to one or more of the industrial automation devices via mobile devices, or via any corresponding device that can locate or locates in an industrial site.

Different embodiments and examples are described below using single units, models, devices (equipment) and data storages (memory), without restricting the embodiments/examples to such a solution. A concept called virtualization may be used. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN), may cause one or more of the functionalities described below to be migrated to any corresponding abstraction or apparatus or device. Therefore, all words and expressions should be interpreted broadly, and they are intended to illustrate, not to restrict, the embodiment.

Figure 1:
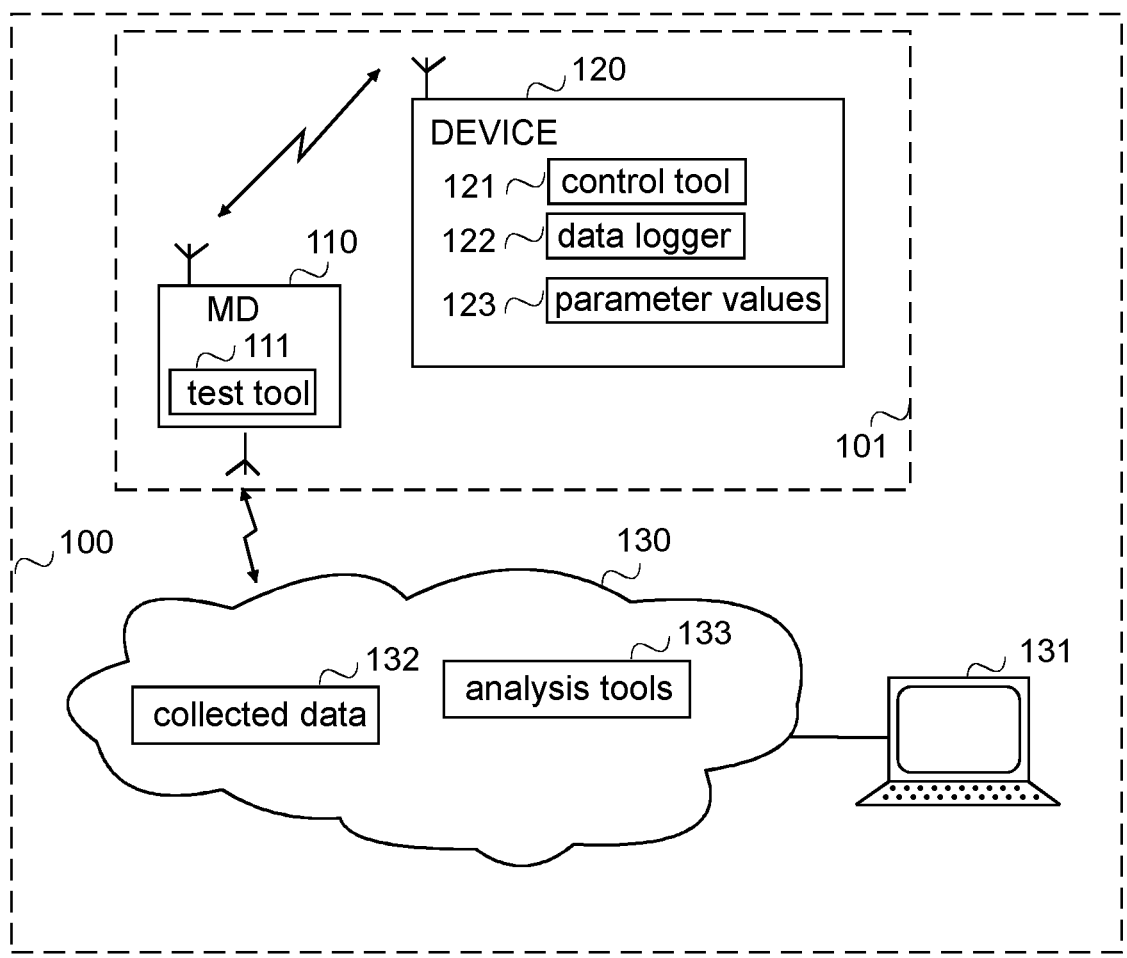
FIG. 1 shows a simplified architecture of a system.

A general exemplary architecture of a system is illustrated in FIG. 1. FIG. 1 is a simplified system architecture of a cloud-based deployment scenario only showing some equipment (apparatuses, devices) and functional entities, all being logical units whose implementation and/or number may differ from what is shown in FIG. 1. The connections shown in FIG. 1 are logical connections; the actual physical connections may be different. It is apparent to a person skilled in the art that the systems may comprise any number of shown elements and that the systems may also comprise other elements, equipment, functional entities and structures, some of which used in or for big data, data management, and communication in the system or in one part of the system. They, as well as the protocols used, are well known by persons skilled in the art and are irrelevant to the actual invention. Therefore, they need not to be discussed in more detail here.

In the example illustrated in FIG. 1, the system 100 comprises one or more industrial sites 101 (only one illustrated in FIG. 1) connected over one or more networks (none shown in FIG. 1) to one or more clouds 130, or cloud platforms (only one illustrated in FIG. 1).

In the illustrated example of FIG. 1, in the industrial site 101 there is a mobile device (MD) 110 of a remote user and one or more industrial automation devices 120 (only one illustrated in the example). It should be appreciated that an industrial site depicts herein any industrial site comprising one or more industrial automation devices 120. A non-limiting list of examples of industrial sites includes power plants, manufacturing plants, chemical processing plants, power transmission systems, mining and mineral processing plants, upstream oil and gas systems, data centers, ships, transportation fleet systems and utility plants.

The mobile device (MD) 110 refers to a computing device (equipment), that is a portable device, and it may also be referred to as a mobile terminal, terminal device, user apparatus, user terminal or user device. Portable computing devices (apparatuses) include wireless mobile communication devices operating with or without a subscriber identification module (SIM) in hardware or in software, including, but not limited to, the following types of devices: mobile phone, smart phone, personal digital assistant (PDA), laptop and/or touch screen computer, tablet (tablet computer), multimedia device, wearable computer and other types of wearable devices, such as clothing and accessories incorporating computer and advanced electronic technologies. The mobile device 110 is configured for remote support, for example for configuring (tuning) of industrial automation devices. For that purpose the mobile device 110 comprises a remote support application provided by a remote tool 111, the remote tool comprising a test tool, i.e. a remote assistance application, for configuring industrial automation devices to perform a test by causing an industrial automation device to install a sub-tool (a sub-program or sub-application, including a set of parameters) called a test, or at least use test parameter values, for example for performance optimization, as will be described in more detail below. It should be appreciated that instead of a test, or test application, or test settings (test parameter values) or test configuration, other terms, for example a temporary application, temporary settings or temporary configuration, may be used. The remote support application, and/or the remote assistance application, may be a smartphone application, for example a drivetune app, configured to connect wirelessly to industrial automation devices, to perform different start-up and troubleshooting tasks.

The industrial automation device 120 refers to electronic equipment (device) that is used for controlling one or more industrial processes, devices, or equipment, according to its settings (parameter values) 123. For example, industrial automation devices may control the position, speed, torque and/or direction of electric motors in conveyors, grinders, winders, pumps and/or fans. The industrial automation device may control the speed and/or torque of a motor by changing the frequency, current and/or voltage of the electrical supply to the motor, for example. However, the details of the controlling functionality of the industrial automation device bear no significance and are therefore not described in detail herein. Further, it should be appreciated that the industrial automation device 120 depicts herein any device, machine, equipment, system and a process whose operations and/or service and/or maintenance may be taken care remotely. Examples of such industrial automation devices include drives, frequency converters, AC/DC converters, DC/AC converters, programmable logic controllers, switches, motion controllers or motion drives, soft starters, etc. It should be appreciated that in the above only some examples are listed.

In the illustrated example of FIG. 1, an industrial automation device 120 comprises, as separate components, in addition to the settings 123, a control tool 121 and a tool called herein a data logger 122. The control tool 121 refers herein to equipment via which parameters and parameter values of the industrial automation device 122 may be adjusted or acquired, and the functions of the industrial automation device 122 otherwise controlled by the mobile device and/or by a person locating on the site 101 and/or remotely from the cloud 130 (and/or from a separate service center). The control tool 121 may comprise a panel, which may be a separate device, or a device detachable connectable to the industrial automation device, or equipment integrated to the industrial automation device. The data logger 122 refers herein to equipment, including different sensors, that measure and collect data according to parameter values in the settings 123. Parameters for the data logger may include a sample interval (sample rate) and/or a buffer size for collected pieces of data (samples) before collected data is transmitted or retrieved, and/or definitions what data to collect, for example.

In the cloud-based deployment, one or more service centers, depicted by a remote user support device 131, provide different remote services using data 132 stored into the cloud and performing analytics 133 in the cloud. The remote user support device 131 comprises user interfaces for user interaction and for remote monitoring and/or remote assistance. In the illustrated example of FIG. 1, the data 132 stored in the cloud 130 comprises at least data collected on the industrial automation device(s). The stored data may comprise also other data, like product data, and/or test configurations, etc. The analysis tools 133 in the cloud 130 may be based on data mining, self-learning artificial intelligence, mathematical models of an industrial process used, etc. An analysis tool may be a condition monitoring tool configured, for example, to identify in one or more condition parameters changes indicative of a developing fault. Another example of an analysis tool includes a performance optimization tool. The details of implementation, purpose and actual functionality of the analysis tools, and/or how and what data is stored and used and/or how the remote user support device accesses and uses the analysis tools and the data in the cloud, or in any other shared data storage for remote support, are not relevant for the implementations, and therefore they are not described in more detail here. It is obvious for one skilled in the art that any known or future analysis tool and/or access method may be used. Further, implementing the examples described herein using a non-cloud deployment for remote support is a straightforward task for one skilled in the art.

In the illustrated example of FIG. 1 the mobile device 110 has at least two communications interfaces, depicted by 2 antennas, one to connect to the cloud 130 wirelessly over one or more networks and one to connect to the industrial automation device 120 wirelessly over a local connection. It should be appreciated that the mobile device 110 is depicted to include 2 antennas only for the sake of clarity. The number of reception and/or transmission antennas, or other communication interfaces, may naturally vary from one to any number according to a current implementation, and the mobile device type. The local connection may be based on a short-range communication technology. A non-limiting list of examples for short-range communication technologies include Bluetooth communication standards, and other wireless local area network technologies, such as radio frequency technologies including Wi-Fi, ZigBee, near field communication (NFC), radio-frequency identification (RFID), and optical wireless technologies including Li-Fi and other technologies using at least one of visible light spectrum, ultraviolet and infrared radiation. Naturally the local connection may use any mobile wireless technology, such LTE, 4G, 5G and beyond, or be a wired connection using Ethernet or universal serial bus (USB), for example. The wireless connection to the cloud 130 may be provided by any mobile system, such as LTE, 4G, 5G and beyond, or a combination of a wireless system and a fixed system, like Wi-Fi or Li-Fi providing access to internet, or other wired network, and via the internet, or the other wired network, to the cloud 130. As to the industrial automation device, it may have a connection to the cloud via any mobile system, such as LTE, 4G, 5G and beyond, or a combination of a wireless system and a fixed system, like Wi-Fi or Li-Fi providing access to internet, or other wired network, and via the internet, or via the other wired network, to the cloud 130. The connection to the cloud 130 from the industrial automation device and/or from the mobile device may be a wired connection as well. As a summary, any existing or future communication technology may be used for the connection between the mobile device 110 and the industrial automation device, and for any connection from the mobile device and/or from the industrial automation device in the industrial site 101 to the cloud 130.

Further, the connections may be secured connections, established according to any known or future security protocol, for example using authentication and passwords and Bluetooth pairing. In the below examples, secured connections are used, without limiting the examples to such a solution.

Figure 2:
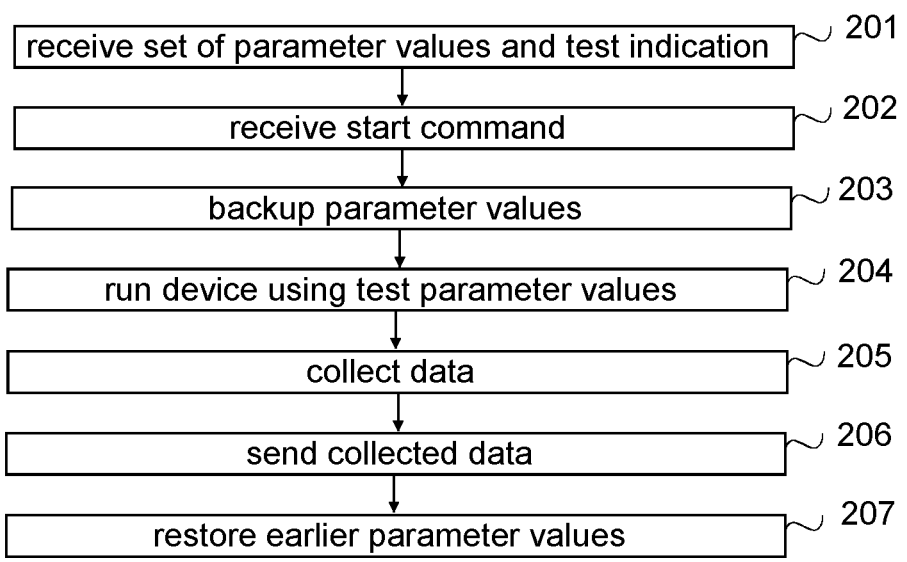
FIGS. 2 to 4 are flow charts illustrating examples of functionalities.

FIG. 2 illustrates an example functionality of an industrial automation device, or more precisely its control tool and data logger, when the industrial automation device has a connection, for example a secure connection to a remote tool, or a test tool, running in a mobile device.

Referring to FIG. 2, a set of parameter values with an indication of a test are received in step 201 from the mobile device. Depending on an implementation, the set of parameter values may comprise values for all parameters in the industrial automation device, or only to one or more parameters whose values are to be amended for the test. The received set of parameter values may comprise one or more new values defining data to be collected. For example, the received set of parameter values may comprise a new value for a sampling interval, i.e. a test sampling interval value. When a start command is received in step 202 from the mobile device, existing parameter values, i.e. parameter values in use when the set was received, are backed up in step 203, because the parameter values were received with the indication of a test. Then the industrial automation device is run in step 204 using the received parameter values (and test instructions, if any received), or if no parameter value for a parameter was received in the set of parameter value, using an existing parameter value for the parameter. During the test run, data on the test run is logged in step 205. The data may be logged using the test sampling interval value, if received, or using an existing sampling interval value, if no test sampling interval value was received in the set of parameter values. Depending on an implementation or instructions possibly received with the set of parameter values, the data logged on the test run is sent in step 206 to the mobile device during the test run, or when the test run has ended. Further, when the test run ends, the existing parameter values are restored in block 207 (since the later values were received with the indication of the test).

In one implementation, the indication of a test is a set of instructions causing the backing up, sending data logged to the mobile device and restoring the earlier (called above existing) parameter values, and deleting after that instructions received in the test. In other words, the test is an application that automatically uninstalls after being executed once.

In another implementation, the indication of a test may be a flag, or a parameter value indicating the test, and detecting the indication causes the industrial automation device to perform the backing up, sending data logged to the mobile device and restoring the earlier (called above existing) parameter values, and deleting after that instructions that may have been received in the test.

By backing up the parameter values and restoring them after the test has ended, it is ensured that the parameter values are for temporary use only, and will be not used accidentally in normal operation. Thanks to that, during the testing strange settings, for example rotating to a counter-direction, may be used without having risk that the strange settings will be in use after the test ends. Further, since the parameter values are used only temporarily, data sampling value may be set to collect data using millisecond or sub-millisecond resolution (granularity), thereby providing more accurate (detailed) information for effective troubleshooting or parameter optimisation (tuning), whereas the remote monitoring in normal operation condition will be continued using a bigger resolution, which is sufficient for efficient monitoring and causes less processing load and smaller amount of data transmitted to the cloud. Hence, the granularity of the collected data may be set in an adaptive manner. The use of temporary parameter values also allows that the data collected for optimisation or for troubleshooting, or for just testing, may be different than data collected for remote monitoring.

Figure 3:
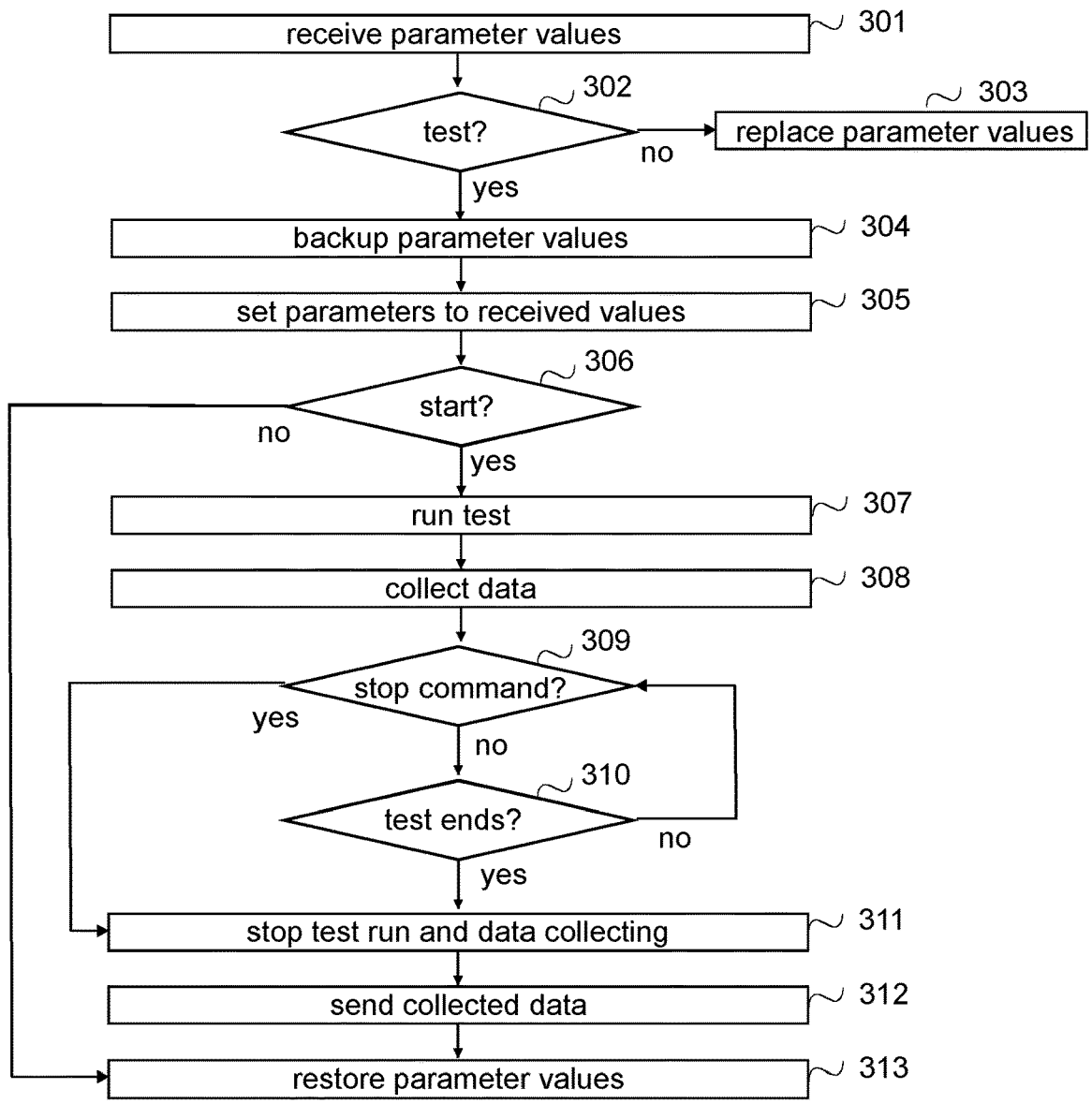

FIG. 3 illustrates another example functionality of an industrial automation device, or more precisely its control tool and data logger, when the industrial automation device has a secure connection with the mobile device (with the remote tool in the mobile device).

Referring to FIG. 3, when one or more parameter values are received in step 301 from the mobile device, it is checked in step 302 whether the received one or more parameter values are associated with an indication of a test run. If the received parameter values are not associated with the indication of a test (step 302: no), existing parameter values are replaced in step 303 by the received parameter values. For example, the received parameter values may relate to commissioning the industrial automation device, or configuring (tuning) its settings.

If the received parameter values are associated with the indication of a test (step 302: yes), existing parameter values are backed up in step 304, and parameters are set in step 305 to have the received parameter values. Then it is monitored in step 306, whether a start command is received. If a start command is received (step 306: yes), the test is run in step 307 and data collected in step 308 according to the parameter values for the test (and test instructions, if any received). The test is run until a stop command is received (step 309) or the test ends (step 310), whichever occurs first. If a stop command is received (step 309: yes) before the test ends, or the test ends (step 310: yes), the test run and data collecting are stopped in step 311, the collected data is sent is step 312 to the mobile device, and the parameter values are restored in step 313 to be the parameter values backed up in step 304, i.e. to the parameter values that existed prior to the test. Hence, regardless of the reason why the test ends, the test parameter values are replaced (overridden), and the settings comprise earlier, "normal" parameter values.

If no start command is received (step 306: no), in the illustrated example it is assumed that a cancel command, or a corresponding command/instruction, is received, and the process proceeds to step 313 to restore parameter values. For example, receiving a new set of parameter values may be interpreted to be a cancel command, causing step 313 to be performed before the process proceeds to step 302.

Figure 4:
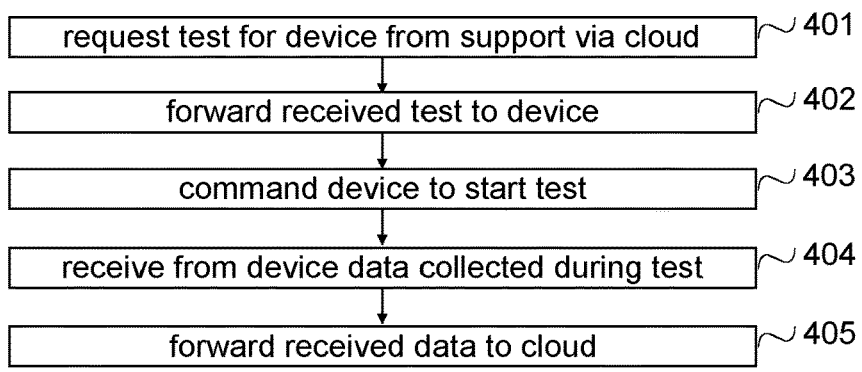

FIG. 4 illustrates an example functionality of the mobile device, or more precisely the functionality of the remote tool comprising the test tool. In the illustrated example it is further assumed that a first secure connection to an industrial automation device and a second secure connection to a cloud platform has been established.

In the illustrated example, a user input triggering a test for the industrial automation device is a user input requesting a specific test for the industrial automation device. Further, in the illustrated example receiving said user input causes that a request for the specific test for the industrial automation device is sent in step 401 to the remote support via the cloud platform without any further user input. When a response to the request is received, the response contains the test, or at least one or more parameter values to be used during the test, depending on the implementation. The received test, or at least the one or more parameter values with an indication of a test, is forwarded in step 403 to the industrial automation device. Depending on an implementation, the forwarding may be performed without any user input, or the user of the mobile device may be prompted to accept forwarding of the test, perhaps guided to set parameter values for the test before the test is forwarded to the industrial automation device, as will be described below. Then sending a command to start the test is caused in step 402. Depending on an implementation, the user may be prompted to input a start command, and when the user input is received, step 403 is performed, or the start command is received as part of the user input triggering the specific test, or accepting forwarding the test.

When data collected during the test is received in step 404, the received collected data is forwarded in step 405 to the cloud without any user involvement.

Further, depending on an implementation, different results illustrating the collected data may be displayed on a user interface of the mobile device.

By obtaining a test from the cloud, it is ensured that an up-to-date test for the specific purpose is run. Further, the amount of specific purpose tests may be huge, thereby allowing very tailored tests with fit-to-purpose granularity of data collected.

Figure 5:
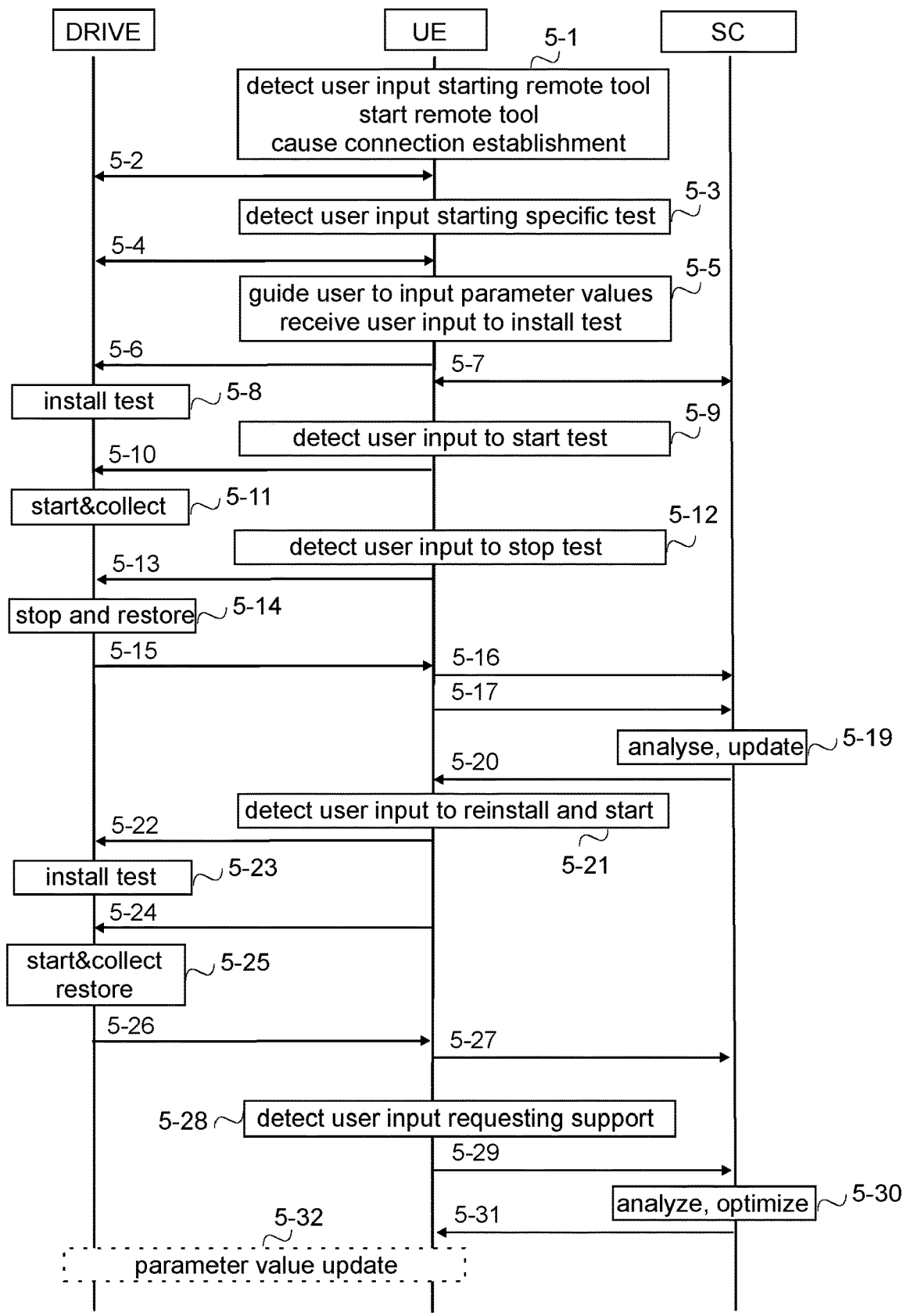
FIGS. 5 and 6 illustrate examples of information exchange.

FIG. 5 illustrates an example of information exchange and different functionalities. In the illustrated example, a drive represents an industrial automation device, an UE (user equipment) illustrates a mobile device comprising the remote tool, and an SC illustrates a cloud with a remote service center.

Referring to FIG. 5, a user input starting the remote tool is detected in step 5-1, the remote tool is started and a connection establishment (messages 5-2) to the drive is caused. Then a user input starting a specific test is detected in step 5-3. For example, the user may have selected one of the tests displayed in a user interface of the UE, as part of the test tool comprised in the remote tool. For example, the user may have selected "Oscillation damping optimization". Selecting the specific test causes in this example that current parameter values of the drive are obtained (messages 5-4). In the illustrated example, the specific test contains information that guides in step 5-5 to input parameter values for the test, for example by searching, parameter per parameter those parameters whose values are to be changed, displaying the parameter with its current value, for example as highlighted, and then providing instructions what the value should be. Some of the parameter values, for example one or more parameter values defining data to be collected, may be preset. Hence, setting the test parameter values does not depend on the user's level of expertise or subjective preferences. For example, for the oscillation damping optimization, the user may be prompted to input either a speed error or a DC voltage to be a value for a parameter "oscillation source", to set a parameter "oscillation compensation" to be off, to change a parameter "speed reference" to 95% of the drive's maximum speed, to change a parameter "sample interval" to be 2 milliseconds, and to change a parameter "buffer size" to be bigger than a result obtained by dividing a sum of an acceleration time and a deceleration time by the sample interval. However, in some implementation the buffer size may be automatically updated, using the above formula and parameter values, for example. Further, in the illustrated example, the test includes an instruction "once the speed indicated by the speed reference has been reached, use zero as a speed reference". Then the user may be prompted that parameter values for the test are set, and the user is provided with a possibility to command the drive to install the test. In the example it is assumed that a user input to command to install the test to the drive is received in step 5-5, and the test is sent in message 5-6 to the drive. Further, since the test is installed, in the illustrated example, it also causes that a connection (message 5-7) to the cloud SC is established. Naturally, the connection may have been established earlier, for example after step 5-1, or later, after step 5-9.

When receiving the test (the set of parameters and the instructions/the indication), the drive installs in point 5-8 the test. The installing may include backing up the existing parameter values and temporarily setting the test parameter values to be in use.

Then a user input to start the test is received in step 5-9 in the UE, and corresponding command is sent (message 5-10) to the drive, causing starting in step 5-11 the drive and running it according to test parameter values (and test instructions, if any received) so that in the illustrated example the motor will reach the indicated top speed. Meanwhile also data is collected in step 5-11. The test may be started by backing up the existing parameter values and temporarily setting the test parameter values to be in use, if backing up and/or temporarily setting are not performed during the installing.

In the illustrated example something unexpected happens and the user of the UE wants to stop the test run. A corresponding user input is received and detected in step 5-12, and a command to stop is sent (message 5-13) to the drive. Hence, having the user in the site in control of the test run increases safety, since the user may stop the test run at any time.

In response to the command, in step 5-14 the drive stops, restores the earlier parameters, as described with FIGS. 2 and 3, the restoring including deleting the instruction received with the test. The drive also sends (message 5-15) data collected during the test to the UE.

The UE forwards (message 5-16) the data collected during the test to the cloud SC. Further, in the illustrated example, a user input stopping the test also triggers that a support request is sent to the remote service center in the cloud SC. A support person in the remote service center may use in step 5-19 one or more analysis tools and the data collected to find out, if any of the parameter values in the test caused problems. In the illustrated example, the support person updates in step 5-19 the parameter values for the test correspondingly, and sends an updated test (message 5-20) to the UE.

The user is prompted that an updated test is available and the test may be reinstalled and start. In the illustrated example a combined input to reinstall and start is received in step 5-21. Hence, the updated test is sent (message 5-22) to the drive, as if it were the first test.

When receiving the test, the drive installs in point 5-23 the test, in a similar way as in step 5-8.

The command to start the test is sent (message 5-24) separately to the drive, and the drive will be started to run, in step 5-25, after installing the test, so that in the illustrated example the motor will reach the indicated top speed. Meanwhile also data is collected in step 5-25 until the drive stops (the test has been run). Then, in step 5-25, the parameter values are restored, as described with FIGS. 2 and 3, the restoring including deleting any instruction received with the test. The drive also sends (message 5-26) data collected during the test to the UE.

The UE forwards (message 5-27) the data collected during the test to the cloud SC. Further, in the illustrated example, a user input requesting support is detected in step 5-28, and a request for support is sent (message 5-29) to the remote service center in the cloud SC. A support person (the same or different than the one in step 5-19) then uses in step 5-30 one or more analysis tools and the data collected to optimize the parameter settings of the drive. Then an optimized set of parameter values is sent (message 5-31) to the UE. Then the drive is configured (tuned to have optimal parameter values) by updating (step 5-32) its parameter values, possibly other settings, by the remote tool. For example, the user of the UE may be prompted to approve the parameter values, which, after user input approving them, are forwarded to the drive, which then replaces existing parameter values, and possible other settings, with the values.

It should be appreciated that in step 5-30, the test may be once again updated, then installed via the UE, test run performed, etc. until the support person decides that test results are good enough to figure out optimal parameter values.

Figure 6:
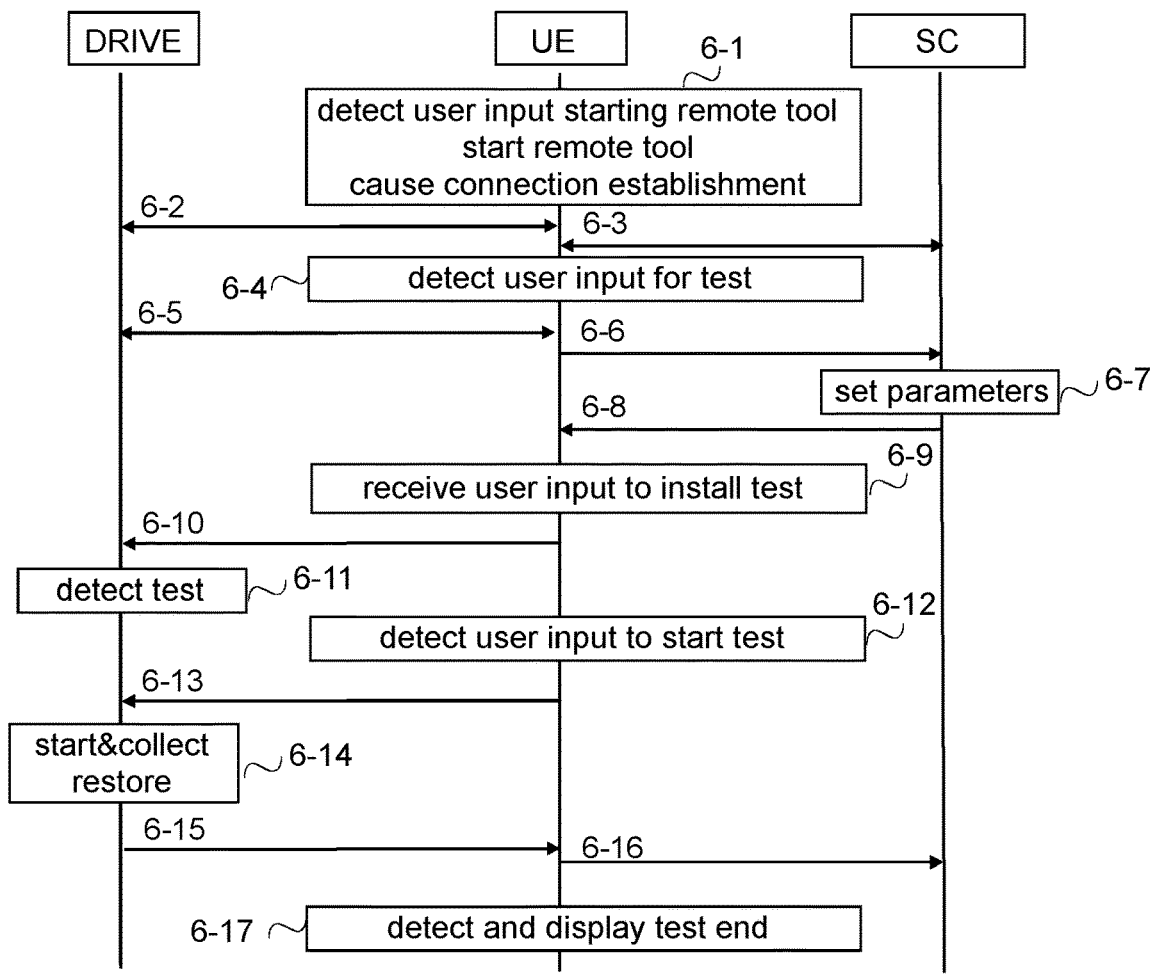

FIG. 6 illustrates another example of information exchange and different functionalities. In the illustrated example, a drive represents an industrial automation device, an UE (user equipment) illustrates a mobile device comprising the remote tool, and SC illustrates a cloud with a remote service center.

Referring to FIG. 6, a user input starting the remote tool is detected in step 6-1, the remote tool is started and a connection establishment (messages 6-2) to the drive is caused and a connection establishment (messages 6-3) to the cloud SC is caused. Then a user input starting a test is detected in step 6-4. For example, the user may have selected a specific test, one of the tests displayed in a user interface of the UE, as part of the test tool comprised in the remote tool, or just a test without indicating the type of test. Selecting the test causes in this example that current parameter values of the drive are obtained (messages 6-5), and in the illustrated example the obtained parameter values are transmitted, together with a support request for a test to the remote service center in the cloud SC. A support person in the remote service center may use in step 6-7 one or more analysis tools, data collected earlier, and the received parameter values to set in step 6-7 parameter values for the test, and sends the parameter values for the test (message 6-8) to the UE. If the support request (message 6-6) did not indicate a specific test, the support person also determines which test to run.

Then the user of the UE may be prompted that parameter values for the test are received, and the user is provided with a possibility to command the drive to install the test. In the example it is assumed that a user input to install the test to the drive is received in step 6-9, and the test is sent in message 6-10 to the drive. For example, the test may be, represented as a combination of parameter settings and instructions: "Run 10 seconds with half speed, then change the speed to maximum speed and run 5 seconds using the maximum speed. Then stop and send data collected during the test. Collect data every half second." In another implementation, the UE may add instructions to back up, restore and delete instructions to the test before sending the test to the drive.

When receiving the test (the set of parameters, an indication of the test and possibly one or more instructions), the drive detects in point 6-11 the indication of the test, backs up the existing parameter values and sets the test parameter values to be in use temporarily. (It should be appreciated that in another implementation this may be performed after a command to start is received.)

Then a user input to start the test is received in step 6-12 in the UE, and corresponding command is sent (message 6-13) to the drive, causing starting in step 6-14 the drive to start and run according to the test parameter values and possible instructions. Meanwhile also data is collected in step 6-14 until the drive stops (the test has been run). Then, in step 6-14, the parameter values are restored, as described with FIGS. 2 and 3, the restoring including deleting possible instructions received with the test. The drive also sends (message 6-16) data collected during the test to the UE.

The UE forwards (message 6-16) the data collected during the test to the cloud SC. Further, in the illustrated example, based on receiving the data collected, the UE detects in step 6-17 that the test has ended and displays in step 6-17 information that the test has ended to the user of the UE so that the user may decide how to continue.

It should be appreciated that in another implementation, instead of messages 6-6, 6-8 and step 6-7, the test tool in the remote tool in the UE is configured to obtain/retrieve a specific test from the cloud.

It should be appreciated that also in the example of FIG. 6, the user of the UE may at any time the test is running, command the drive to stop.

As is evident from the examples, having a user on the site, giving the test related commands and settings to the drive, increases security of the test runs. Further, a drive cannot be commanded to run a test without a user input received in a mobile device that would provide the drive to run the test.

The steps, information exchange, and related functions described above in FIGS. 2 to 6 are in no absolute chronological order, and some of the steps/information exchange/related functions may be performed simultaneously or in an order differing from the given one. For example, a connection establishment may happen earlier or later than what is described in an example above. Other functions can also be executed between the steps or within the steps, and other information can be exchanged. Some of the steps or part of the steps or some of information exchange can also be left out or replaced by a corresponding step or part of the step or information exchange. Further, the described processes, information exchange and steps within processes, may run in parallel, and features from one process (functionality) may be combined to another process (functionality).

The techniques and methods described herein may be implemented by various means so that an apparatus/equipment/a device configured to provide the test tool, or to perform a test run according to at least partly on what is disclosed above with any of FIGS. 1 to 6, including implementing one or more functions/operations of a corresponding apparatus/tool described above with an embodiment/example, for example by means of any of FIGS. 1 to 6, comprises not only prior art means, but also means for implementing the one or more functions/operations of a corresponding functionality described with an embodiment/example, for example by means of any of FIGS. 1 to 6, and the apparatus may comprise separate means for each separate function/operation, or means may be configured to perform two or more functions/operations. Apparatuses (devices, equipments) may generally include one or more processors, controllers, control units, micro-controllers, or the like connected to one or more memories and to various interfaces of the apparatus/equipment, configured to implement the test tool or the test run. For example, one or more of the means and/or any tool described above may be implemented in hardware (one or more devices), firmware (one or more devices), software (one or more modules), or combinations thereof.

Figure 7:
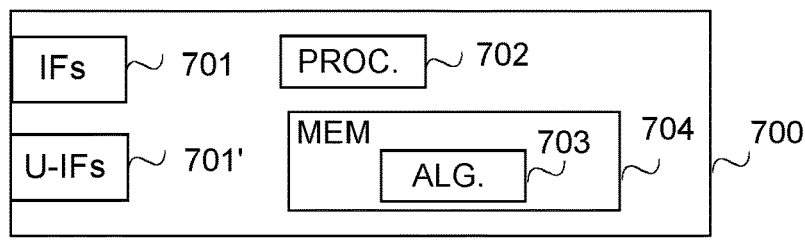
FIGS. 7 and 8 are schematic block diagrams.

FIG. 7 is a simplified block diagram illustrating some units for an apparatus 700 configured to provide the functionality described above with FIGS. 1 to 6 with the mobile device or the UE, or a corresponding computing device, comprising at least the remote tool with the test tool, or an apparatus 700 comprising some of the corresponding functionality if functionalities are distributed in the future.

Referring to FIG. 7, the apparatus 700 comprises one or more interfaces (IF) 701 for retrieving (obtaining) data from industrial automation devices and from one or more clouds, or from different shared databases and for receiving and/or transmitting information from or to industrial automation devices and remote service centers, including different human-machine interfaces. The apparatus further comprises one or more user interfaces (U-IF) 701' for user interaction. The apparatus 700 further comprises one or more processors 702 configured to implement the functionality of the mobile device, or the UE, or a corresponding computing device, described above with FIGS. 1 and 4 to 6, or at least part of corresponding functionality as a sub-unit functionality if a distributed scenario is implemented, with corresponding algorithms 703, and one or more memories 704 usable for storing a computer program code required for the functionality of the apparatus, including the test tool, or a corresponding computing device/equipment, i.e. the algorithms for implementing the functionality. The memory 704 is also usable for storing other information, such as information for establishing secure connections.

Figure 8:
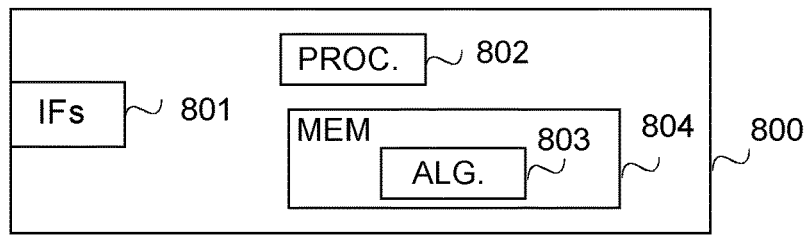

FIG. 8 is a simplified block diagram illustrating some units for an apparatus 800 configured to provide the industrial automation device, or a corresponding computing device, configured to process parameter sets with indication of a test as described above with FIGS. 1 to 6, or an apparatus 800 comprising some of the corresponding functionality if functionalities are distributed in the future.

Referring to FIG. 8, the apparatus 800 comprises one or more interfaces (IF) 801 for receiving and/or transmitting information, including parameter values, from or to other apparatuses, including different human-machine interfaces. The apparatus 800 further comprises one or more processors 802 configured to implement the functionality of the industrial automation device or the drive, or a corresponding computing device, described above with FIGS. 1 to 3, 5 and 6, or at least part of corresponding functionality as a sub-unit functionality if a distributed scenario is implemented, with corresponding algorithms 803, and one or more memories 804 usable for storing a computer program code required for the functionality of the apparatus, or a corresponding computing device/equipment, i.e. the algorithms for implementing the functionality. The memory 804 is also usable for storing (backing up) parameter values, for temporarily storing test parameter values, possible test instructions, collected data (or buffers for the collected data), and other information.

Generally a processor 702, 802 is a central processing unit, but the processor may be an additional operation processor. Each or some or one of tools and/or algorithms described herein may be configured as a computer or a processor, or a microprocessor, such as a single-chip computer element, or as a chipset, including at least a memory for providing storage area used for arithmetic operation and an operation processor for executing the arithmetic operation. The one or more processors may comprise one or more computer processors, application-specific integrated circuits (ASIC), digital signal processors (DSP), digital signal processing devices (DSPD), programmable logic devices (PLD), field-programmable gate arrays (FPGA), graphics processing units (GPUs), logic gates and/or other hardware components that have been programmed and/or will be programmed by downloading computer program code (one or more algorithms) in such a way to carry out one or more functions of one or more embodiments/implementations/examples. An embodiment provides a computer program embodied on any client-readable distribution/data storage medium or memory unit(s) or article(s) of manufacture, comprising program instructions executable by one or more processors/computers, which instructions, when loaded into an apparatus/device, constitute the test tool, or the remote tool, or the control tool or the data logger tool. Programs, also called program products, including software routines, program snippets constituting "program libraries", applets and macros, can be stored in any medium and may be downloaded into an apparatus. In other words, each or some or one of the tools and/or the algorithms described above may be an element that comprises one or more arithmetic logic units, a number of special registers and control circuits.

The memory 704, 804 may generally include volatile and/or non-volatile memory, for example EEPROM, ROM, PROM, RAM, DRAM, SRAM, double floating-gate field effect transistor, firmware, programmable logic, etc. and typically store content, data, or the like. In other words, the one or more memories 704, 804 may be of any type (different from each other), have any possible storage structure and, if required, being managed by any database management system. It is to be noted that the memory, or part of it, may be any computer-usable non-transitory medium within the processor/apparatus or external to the processor/apparatus, in which case it can be communicatively coupled to the processor/apparatus via various means as is known in the art. Examples of an external memory include a removable memory detachably connected to the apparatus, a distributed database and a cloud server. The memory may also store computer program code such as software applications (for example, for one or more of the tools) or operating systems, information, data, content, or the like for the processor to perform steps associated with operation of the apparatus in accordance with examples/embodiments.

It will be obvious to a person skilled in the art that, as technology advances, the inventive concept can be implemented in various ways. The invention and its embodiments are not limited to the examples described above, but may vary within the scope of the claims.

What is claimed is:

1. A computer-implemented method for a mobile device, the method comprising:
running a remote assistance application for industrial automation devices;
establishing, using the remote assistance application, a first connection to an industrial automation device and a second connection to a shared data storage, wherein the first connection is a local connection between the mobile device and the industrial automation device, the mobile device being located at an industrial site where the industrial automation device is located, and wherein the second connection is over at least one network;
detecting in the remote assistance application a first user input triggering a test for the industrial automation device;
causing sending via the first connection from the mobile device at least a set of parameter values with an indication of a test to the industrial automation device, wherein the indication of the test is a set of instructions comprising at least instructions to back up existing parameters before the test is run and to restore the existing parameters after the test ends;
receiving a second user input to start the test, wherein the second user input is different from the first user input;
causing sending from the mobile device to the industrial automation device via the first connection a command to start to run the test;

receiving data from the industrial automation device via the first connection; and forwarding the data to the shared data storage via the second connection.

2. The computer-implemented method of claim 1, further comprising:

receiving a user input to stop the test;

causing sending from the mobile device to the industrial automation device via the first connection a command to stop running the test.

3. The computer-implemented method of claim 1, further comprising:

obtaining, in response to detecting the user input triggering a test for the industrial automation device, parameter values currently in use;

guiding a user of the mobile device to update one or more of the parameter values currently in use;

updating one or more of the parameter values according to received user input; and sending at least the updated parameter values in the set of parameter values.

4. The computer-implemented method of claim 1, further comprising:

obtaining, by the mobile device, in response to detecting the user input triggering the test for the industrial automation device, parameter values currently in use in the industrial automation device;

sending, from the mobile device, the obtained parameter values and a support request for a test to a remote service center;

receiving, in the mobile device, as a response to the support request, at least the set of parameter values that are sent with the indication of the test via the first connection from the mobile device to the industrial automation device.

5. The computer-implemented method of claim 1, further comprising:

obtaining, by the mobile device, in response to detecting the user input triggering a specific test for the industrial automation device, via the second connection from the data storage at least a set of parameter values for the specific test to be sent with the indication of the test.

6. The computer-implemented method of claim 1, wherein the set of parameter values comprises at least a test sampling interval value.

7. A computer-implemented method for an industrial automation device, the method comprising:

receiving, in the industrial automation device, from a mobile device located at an industrial site where the industrial automation device is located, via a local connection established between the mobile device and the industrial automation device, a set of parameter values with an indication of a test, wherein the indication of the test is a set of instructions comprising at least instructions to back up existing parameters before the test is run and to restore the existing parameters after the test ends;

receiving in the industrial automation device, via the local connection, from the mobile device a start command;

performing, in response to receiving the start command, at least the following:

backing up, by the industrial automation device existing parameter values;

running, by the industrial automation device, a test run according to the received parameter values;

collecting, by the industrial automation device, data on the test run using a test sampling interval value;

sending the data collected on the test run from the industrial automation device to the mobile device via the local connection; and restoring, when the test ends, by the industrial automation device, the earlier parameter values.

8. The computer-implemented method of claim 7, further comprising:

receiving, while the test is running, in the industrial automation device, via the local connection, a stop command from the mobile device;

stopping the test run;

stopping collecting the data; and performing the sending and restoring.

9. The computer-implemented method of claim 7, wherein the set of parameter values comprises at least the test sampling interval value.

10. A mobile device comprising:

at least one processor; and at least one memory storing a computer program code, wherein the at least one memory and the computer program code are configured, with the at least one processor, to perform at least the following:

running a remote assistance application for industrial automation devices;

establishing, using the remote assistance application, a first connection to an industrial automation device and a second connection to a shared data storage, wherein the first connection is a local connection between the mobile device and the industrial automation device, the mobile device being located at an industrial site where the industrial automation device is located, and wherein the second connection is over at least one network;

detecting in the remote assistance application a first user input triggering a test for the industrial automation device;

causing sending via the first connection from the mobile device at least a set of parameter values with an indication of a test to the industrial automation device, wherein the indication of the test is a set of instructions comprising at least instructions to back up existing parameters before the test is run and to restore the existing parameters after the test ends;

receiving a second user input to start the test, wherein the second user input is different from the first user input;

causing sending from the mobile device to the industrial automation device via the first connection a command to start to run the test;

receiving data from the industrial automation device via the first connection; and forwarding the data to the shared data storage via the second connection.

11. The mobile device of claim 10, wherein the at least one memory and computer program code are further configured, with the at least one processor, to perform the following:

receiving a user input to stop the test;

causing sending from the mobile device to the industrial automation device via the first connection a command to stop running the test.

12. The mobile device of claim 10, wherein the at least one memory and computer program code are further configured, with the at least one processor, to perform the following:

obtaining, by the mobile device, in response to detecting the user input triggering a test for the industrial automation device, parameter values currently in use in the industrial automation device;

guiding, by the mobile device, a user of the mobile device to update one or more of the parameter values currently in use;

updating by the mobile device, one or more of the parameter values according to received user input; and sending from the mobile device to the industrial automation device via the first connection at least the updated parameter values in the set of parameter values.

13. The mobile device of claim 10, wherein the at least one memory and computer program code are further configured, with the at least one processor, to perform the following:

obtaining, by the mobile device, in response to detecting the user input triggering the test for the industrial automation device, parameter values currently in use in the industrial automation device;

sending, from the mobile device, the obtained parameter values and a support request for a test to a remote service center;

receiving, in the mobile device, as a response to the support request, at least the set of parameter values that are sent with the indication of the test via the first connection from the mobile device to the industrial automation device.

14. The mobile device of claim 10, wherein the at least one memory and computer program code are further configured, with the at least one processor, to perform the following:

obtaining, by the mobile device, in response to detecting the user input triggering a specific test for the industrial automation device, via the second connection from the data storage at least a set of parameter values for the specific test to be sent with the indication of the test.

15. An industrial automation device comprising:

at least one processor; and at least one memory storing a computer program code, wherein the at least one memory and the computer program code are configured, with the at least one processor, to perform at least the following:

receiving, from a mobile device located at an industrial site where the industrial automation device is located, via a local connection established between the mobile device and the industrial automation device, a set of parameter values with an indication of a test, wherein the indication of the test is a set of instructions comprising at least instructions to back up existing parameters before the test is run and to restore the existing parameters after the test ends;

receiving in the industrial automation device, via the local connection from the mobile device a start command;

performing, in response to receiving the start command, at least the following:

backing up, by the industrial automation device, existing parameter values;

running, by the industrial automation device, a test run according to the received parameter values;

collecting, by the industrial automation device, data on the test run using a test sampling interval value;

sending the data collected on the test run from the industrial automation device to the mobile device via the local connection; and restoring, when the test ends, by the industrial automation device, the earlier parameter values.

16. The industrial automation device of claim 15, wherein the at least one memory and computer program code are further configured, with the at least one processor, to perform the following:

receiving, while the test is running, in the industrial automation device, via the local connection, a stop command from the mobile device;

stopping the test run;

stopping collecting the data; and performing the sending and restoring.

17. The industrial automation device of claim 15, wherein the set of parameter values comprises at least the test sampling interval value.

18. The industrial automation device of claim 15, wherein the industrial automation device is one of a drive, a frequency converter, an AC/DC converter, a DC/AC converter, a DC/DC converter, a programmable logic controller, a switch, a motion controller, a motion drive, or a soft starter.

19. A non-tangible computer-readable medium comprising at least one of a first set of instructions for causing a device to perform a first process, or a second set of instructions for causing the device to perform a second process, wherein the first process comprises at least the following:

establishing, by the device, a first connection to an industrial automation device and a second connection to a shared data storage, wherein the first connection is a local connection between the device and the industrial automation device, the device being located at an industrial site where the industrial automation device is located, and the second connection is over at least one network;

causing sending, in response to detecting a first user input triggering a test for the industrial automation device, via the first connection from the device at least a set of parameter values with an indication of the test to the industrial automation device, wherein the indication of the test is a set of instructions comprising at least instructions to back up existing parameters before the test is run and to restore the existing parameters after the test ends;

causing sending, in response to receiving a second user input to start the test, from the device to the industrial automation device via the first connection, a command to start to run the test, wherein the second user input is different from the first user input;

receiving data from the industrial automation device in the device via the first connection; and forwarding the data to the shared data storage via the second connection, wherein the second process comprises at least the following:

receiving, from the device located at the industrial site where the industrial automation device is located, via the local connection established between the device and the industrial automation device, the set of parameter values with the indication of a test, wherein the indication of the test is a set of instructions comprising at least instructions to back up existing parameters before the test is run and to restore the existing parameters after the test ends;

backing up, in response to receiving in the device, via the local connection from the mobile device a start command of the test, existing parameter values;

running, by the device, a test run according to the received parameter values;

collecting, by the device, data on the test run using a test sampling interval value;

sending the data collected on the test run from the device to the mobile device via the local connection; and restoring, when the test ends, by the device, the earlier parameter values.

\* \* \* \* \*